US006862368B1

(12) United States Patent
He et al.

(10) Patent No.: US 6,862,368 B1
(45) Date of Patent: Mar. 1, 2005

(54) METHOD AND APPARATUS FOR EDGE DETECTION

(75) Inventors: Haiyan He, Ossining, NY (US); Johan Gerard Willem Maria Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 644 days.

(21) Appl. No.: 09/639,154

(22) Filed: Aug. 16, 2000

Related U.S. Application Data

(60) Provisional application No. 60/187,422, filed on Mar. 7, 2000, and provisional application No. 60/175,777, filed on Jan. 12, 2000.

(51) Int. Cl.$^7$ .................................................. G06K 9/48
(52) U.S. Cl. ...................................... 382/199; 382/264
(58) Field of Search ................................. 382/199, 243, 382/254, 260–264, 266

(56) References Cited

U.S. PATENT DOCUMENTS

| 4,463,375 | A | * | 7/1984 | Macovski ................. 378/98.12 |
| 4,979,022 | A | * | 12/1990 | Snashall et al. ............. 348/584 |
| 5,212,740 | A | | 5/1993 | Paek et al. ..................... 382/22 |
| 5,436,564 | A | * | 7/1995 | Kreger et al. ................ 600/411 |
| 5,666,164 | A | | 9/1997 | Kondo et al. ................ 348/441 |
| 5,697,957 | A | * | 12/1997 | Noren et al. ................... 607/28 |
| 5,724,097 | A | * | 3/1998 | Hibi et al. ............. 375/240.04 |
| 5,852,470 | A | | 12/1998 | Kondo et al. ................ 348/448 |
| 5,920,356 | A | | 7/1999 | Gupta et al. ................. 348/606 |
| 6,005,983 | A | | 12/1999 | Anderson et al. ............. 348/43 |
| 6,130,966 | A | * | 10/2000 | Sekine et al. ................ 382/299 |

FOREIGN PATENT DOCUMENTS

| EP | 0257129 A1 | 3/1988 |
| GB | 2322252 A | 8/1998 |
| JP | 57310 A | 1/1993 |
| JP | 09233489 A | 9/1997 |
| JP | 10063839 A | 3/1998 |

OTHER PUBLICATIONS

Herpel, et al. "A VLSI implementation of a state variable filter algorithm", IEEE, pp. 138–143, 1991.*
Simoncelli "Design of multi–dimensional derivative filters", IEEE, pp. 790–794, 1994.*
"Rational Unsharp Masking Technique", by G. Ramponi et al., Journal of Electronic Imaging.
"Edge Detection", by A.K. Jain, Fundmentals of Digital Image Processing.
"De–Interlacing– an Overview", by G. de Haan et al., Proceedings of the IEEE.
U.S. 000057, U.S. Appl. No. 09/519,548, filed Mar. 6, 2000.
U.S. 000182, Method and Apparatus for Improving Conversion from SD to HDTV, filed concurrently herewith.
U.S. 000058, System and Method for Improving the Sharpness of a Video Image, filed concurrently herewith.

* cited by examiner

Primary Examiner—Daniel Mariam (57) ABSTRACT

An edge detection technique combines a low-pass second derivative of an image signal, a low-pass first derivative of the image signal, and an estimation of edge frequency. The edge frequency estimation is preferably based on a ratio of a third to a first low-pass derivative of image signal. The image signal is preferably a luminance signal.

33 Claims, 10 Drawing Sheets

RULE 1

RULE 2

FIG. 14F

METHOD AND APPARATUS FOR EDGE DETECTION

RELATED APPLICATIONS

A related application entitled METHOD AND APPARATUS FOR IMPROVING CONVERSION FROM SD TO HDTV, having the same drawings and detailed description as the present application, is being filed concurrently herewith by the same inventors.

A second patent application by the same inventors as the present application and entitled "SYSTEM AND METHOD FOR IMPROVING THE SHARPNESS OF A VIDEO IMAGE" (ID 701025) is being filed concurrently herewith, and is incorporated herein by reference.

The present application claims benefit of provisional patent applications Ser. No. 60/175,777, filed Jan. 12, 2000 and 60/187,422, filed Mar. 7, 2000, which are incorporated herein by reference.

BACKGROUND OF THE INVENTION

1. Field of the Invention

The invention relates to the field of image processing, particularly to edge detection within an image.

2. Related Art

Anil K. Jain, in his book *Fundamentals of Digital Image Processing*, Prentice Hall 1989, pp. 347–357, proposes a method for edge detection using first a Laplace operator then a gradient operator.

SUMMARY OF THE INVENTION

It is an object of the invention to improve edge detection.

This object is achieved in that an estimation of edge frequency is used to distinguish between soft and hard edges. Preferably the estimation of edge detection is based on a ratio of the third derivative to the first derivative being greater than a threshold. Preferably, the edge detection technique of the invention is used in the processing of video signals.

Further objects and advantages will be apparent in the following.

BRIEF DESCRIPTION OF THE DRAWING

The invention will now be described by way of non-limiting example with reference to the following drawings.

DETAILED DESCRIPTION OF THE PREFERRED EMBODIMENTS

Figure 1:
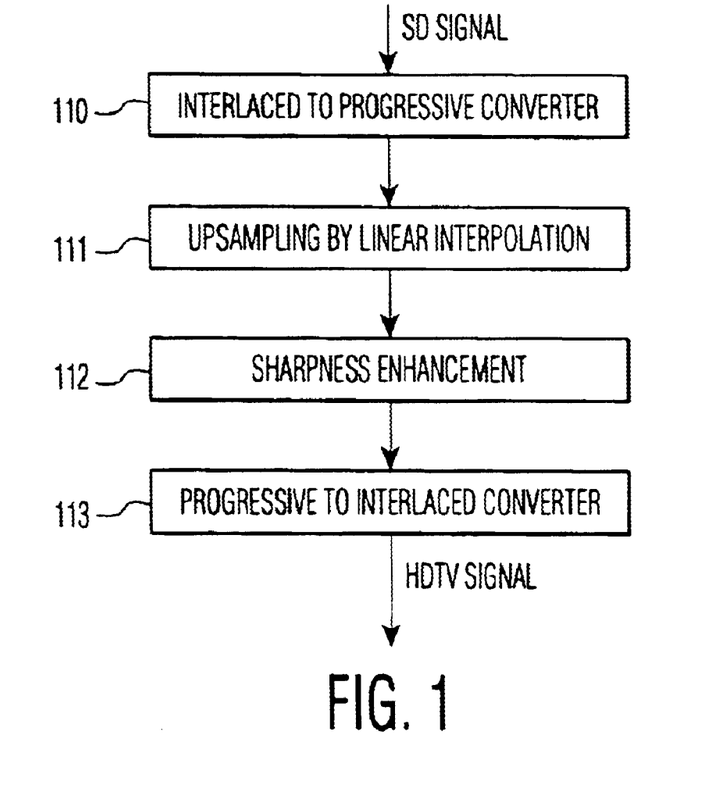
FIG. 1 shows an overview of a conversion unit for converting an SD signal to an HDTV signal.

FIG. 1 shows an overview of a device in accordance with the invention. An SD signal is fed to an interlaced to progressive converter 110. More information about interlaced to progressive converters can be found in G. De Haan and E. B. Bellers, "De-Interlacing—an overview", Proc. IEEE, vol. 86, pp. 1839–1857 (September 1998). At box 111, up-sampling is achieved by linear interpolation. Up-sampling can be performed separately for the horizontal and vertical directions prior to sharpness enhancement. The signal is then subjected to sharpness enhancement at box 112. Then a progressive to interlaced converter, which just takes every other line for each frame, turns the signal into an HDTV signal at 113. The boxes of FIG. 1 can be realized with hardwired circuits, or as code within a general purpose processor.

Figure 2:
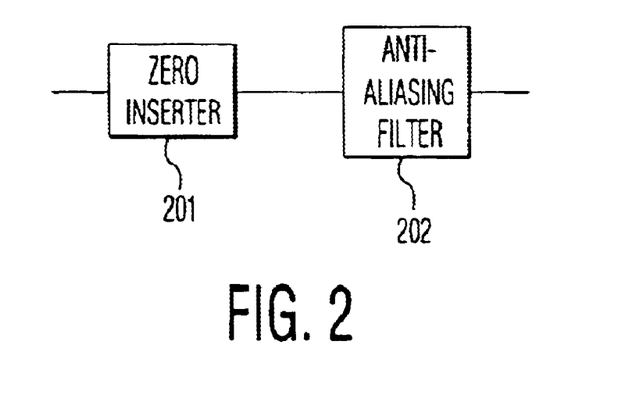
FIG. 2 shows more detail of the up-sampling unit.
Figure 3A:
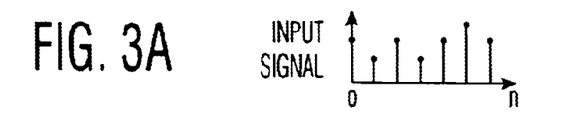
FIGS. 3 through 8 show operation of the linear interpolator.
Figure 3B:
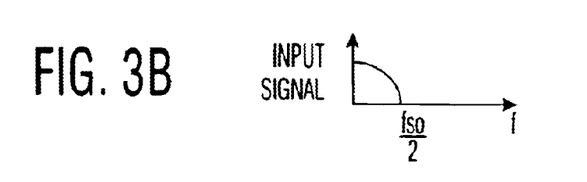

FIG. 2 shows more detail of the structure of box 111. Box includes a conventional zero insertion unit 201 and a conventional anti-aliasing filter 202. The anti-aliasing filter preferably has the following coefficients:

$$\left[\frac{-3}{32}, 0, \frac{19}{32}, 1, \frac{19}{32}, 0, \frac{-3}{32}\right]$$

FIGS. 3 through 8 show operation the operation of the linear interpolator. FIG. 3a shows a time domain version of the input signal to the linear interpolator with samples 0 through n of different amplitudes. FIG. 3b shows a frequency domain version of the same input signal. The frequency domain version falls to zero at the value $f_{SD}/2$, where $f_{SD}$ is the original sampling frequency.

Figure 4A:
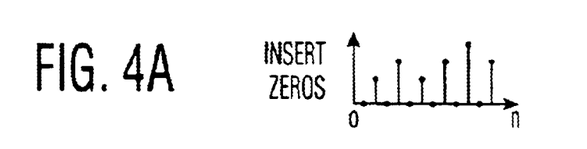
Figure 4B:
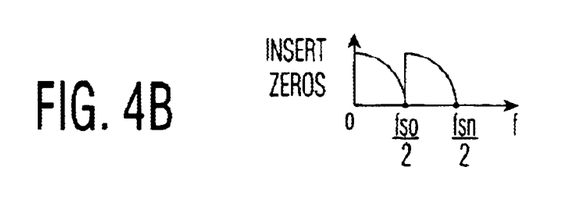

FIG. 4a shows the action of the zero inserter 201 in the time domain. FIG. 4b shows the result of the zero inserter in the frequency domain. The zero inserter causes the appearance of a second peak in the frequency domain, having a cutoff at $f_{sn}/2$, where $f_{sn}$ is the new sample frequency due to interpolation, in other words, the factor of up-scaling in this example is two.

Figure 5:
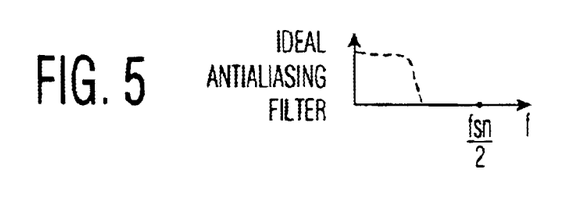

FIG. 5 shows the behavior of the ideal anti-aliasing filter in the frequency domain.

Figure 6A:
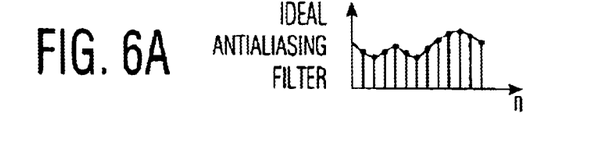
Figure 6B:
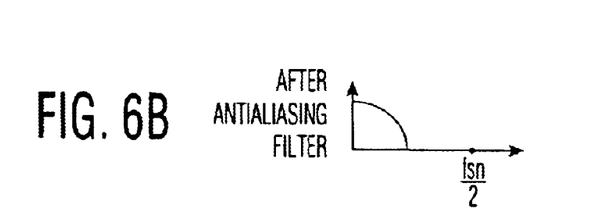

FIG. 6a shows, in the time domain, the result of the ideal anti-aliasing filter on the output of the zero inserter. FIG. 6b shows the same signal as FIG. 6a, except in the frequency domain.

Figure 7:
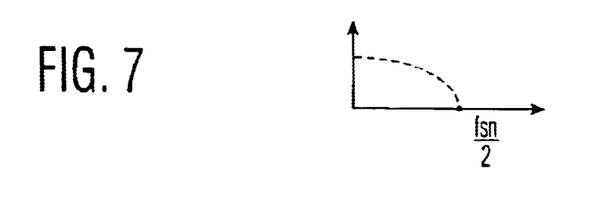

FIG. 7 shows the profile of a real anti-aliasing filter in the frequency domain.

Figure 8A:
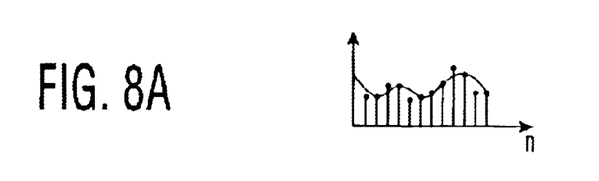
Figure 8B:
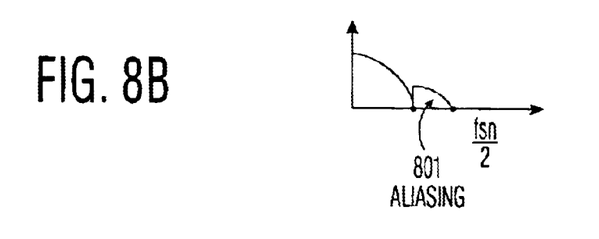

FIG. 8a shows, in the time domain, the result of a real anti-aliasing filter on the output of the zero inserter. FIG. 8b shows, in the frequency domain, the result of the real anti-aliasing filter. This curve shows aliasing at 801.

Figure 9:
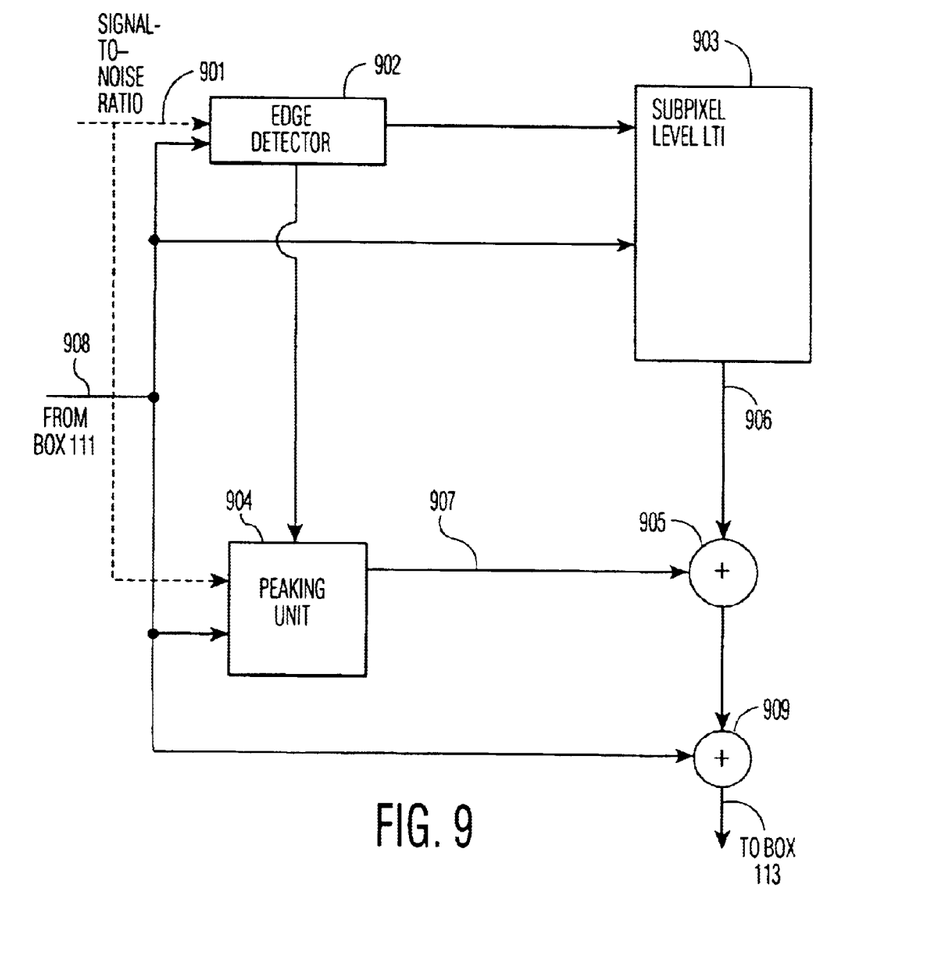
FIG. 9 shows a device for achieving sharpness enhancement.

FIG. 9 shows more detail of box 112. Input 901 comes from a signal-to-noise calculator. The preferred type of noise detection is disclosed in U.S. patent application Ser. No. 09/519,548, filed Mar. 6, 2000, entitled: "Subjective Noise Measurement on Active Video Signal", incorporated herein by reference. Input 908 comes from box 111. Both the edge detector 902 and the peaking unit 904 use both inputs 908 and 901. The edge detector 902 will be further described below. The peaking unit 904 can be any conventional peaking unit, such as the one shown in European patent document EP 0257129. The peaking unit will be shut off if an edge is detected. The sub-pixel level Luminance Transient Improvement ("LTI") 903 takes inputs from both the edge detector 902 and box 111. The unit 903 is described in a patent application by the same inventors as the present application and entitled "SYSTEM AND METHOD FOR IMPROVING THE SHARPNESS OF A VIDEO IMAGE" (ID 701025), filed concurrently herewith and which is incorporated herein by reference. The outputs 906 and 907 are both in YUV 4:2:2 format. These outputs are then added by adder 905. The output signal from the adder 905 is added to the input signal at 908 from box 111 by adder 909. The output of adder 909 goes to box 113 from FIG. 1. Signals on line 908 are in YUV 4:2:2 format.

Conceptually, the device of FIG. 9 combines a linear technique, i.e. peaking, with a non-linear technique, i.e. LTI, to improve interpolation results.

The peaking unit 904 enhances high frequency content by adding a high-passed signal to the original signal. Peaking has strengths and weaknesses as an image processing technique. After peaking, the amplitudes of the transients are increased; but the peaking process can easily be overdone, resulting in large rims about big transients. Moreover, peaking lacks robustness on noisy images. "Intelligent" control, required to avoid artifacts, may be attempted using a more complex peaking algorithm; however, the linear nature of peaking means that even with these more complex algorithms new frequencies cannot be introduced.

LTI shifts pixels towards the edge center. Edge detection decides which pixels need to be shifted using LTI. Therefore higher than normal frequencies are generated around the edge, and the slope of the transient is increased. LTI is robust in the presence of noise, when edge detection is reliable. Preferably edge detection is related to the signal-to-noise ratio of the input video signal. When edge detection is dependent on signal-to-noise ratio, then the control of the output will also be dependent on signal-to-noise ratio. Preferably, also, the subjective effect of LTI is not as strong as that of peaking, when the amplitude of a transient is small.

In the preferred embodiment, peaking and LTI are combined such that peaking works on small transients, while LTI works on large transients. In other words, for small transients, the amplitude is increased, whereas for large transients, the slope is increased. This technique makes a distinction between a soft edge, to which LTI will not be applied, and a sharper edge, to which LTI will be applied.

Generally, overflow/underflow problems that yield annoying artifacts only occur where there are large transients, i.e. on edges. Accordingly, underflow/overflow does not need to be prevented in the peaking unit, saving considerable circuitry or computing time there.

Though most of this disclosure is related to one dimensional image processing, effected in two passes, one horizontal and one vertical; 2D techniques may be used as well, for instance, 2D peaking may be used on texture parts of the image.

Figure 10:
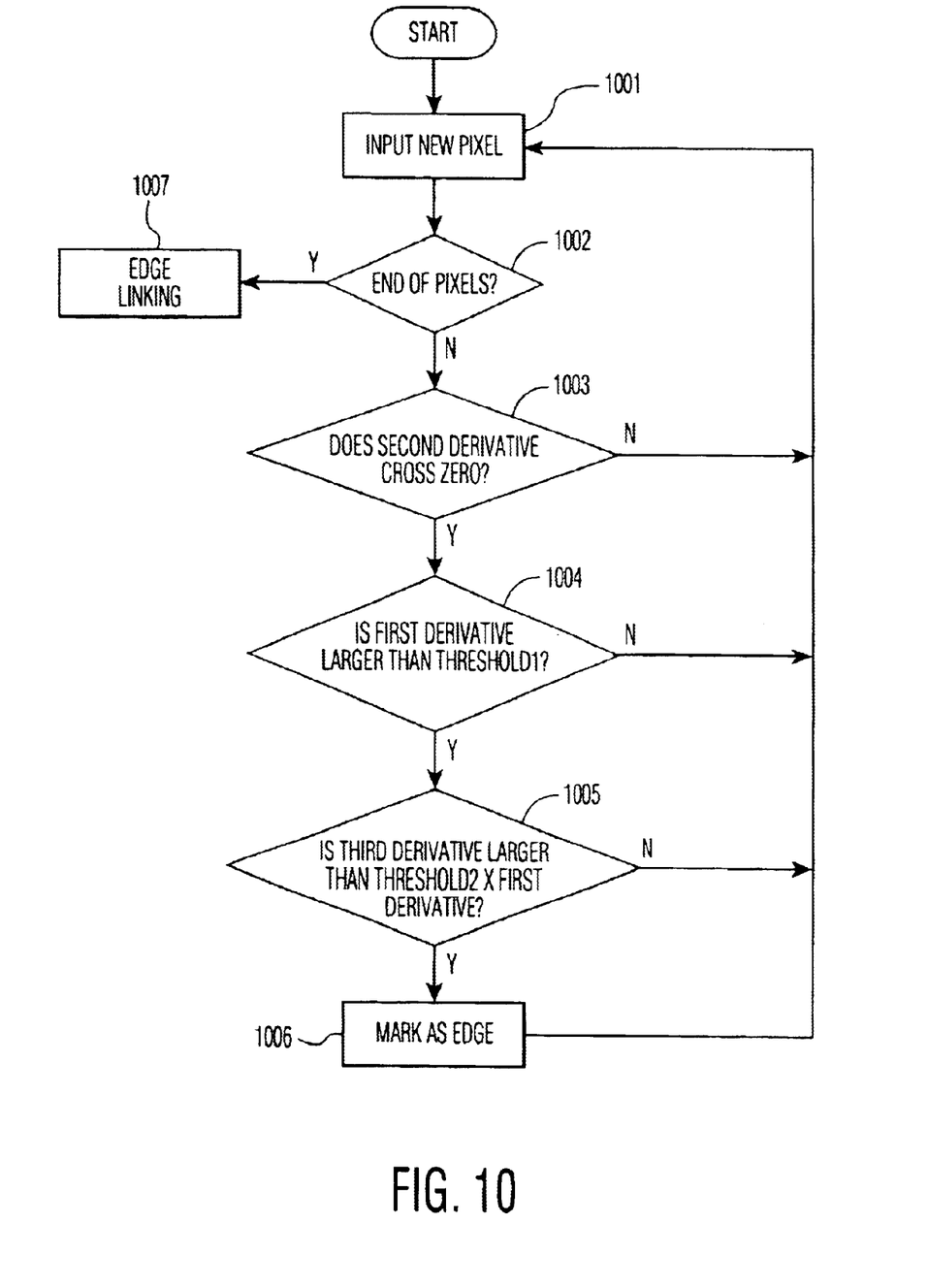
FIG. 10 is a flowchart relating to edge detection.

FIG. 10 illustrates flow of the preferred edge-detection procedure for use in box 902; however, other edge detectors may be designed by those of ordinary skill in the art for the purpose of input to the unit 903. The procedure of FIG. 10 may be performed in any type of processor, for instance, either by hard-wired hardware or by a programmed multipurpose processor. For instance, boxes 1003–1005 may each be realized by an independent special purpose circuit.

In a two dimensional image, edge detection in accordance with FIG. 10 is preferably performed in each dimension separately. In other words, the flow chart of FIG. 10 is performed twice. This is preferred for two reasons. First, the eye is typically more sensitive to lines and edges in horizontal and vertical directions. Second, a diagonal edge appears as an edge in both horizontal and vertical directions.

The dimensions may be scanned in either order, vertical first or horizontal first. During the vertical scan, only horizontal edges will be detected and marked as edges. During the horizontal scan, only the vertical edges will be detected and marked as edges.

Box 1001 shows a request for input of a new pixel. At box 1002, a test is performed to see if the last pixel has been passed. If so, an edge linking procedure 1007 is begun. If not, at 1003, it is tested whether a low-pass second derivative crosses zero. If the result of the test of box 1002 is positive, an edge has been detected on the pixel level and control passes to 1004. If not, control passes to box 1001.

At 1004, it is determined whether a low-pass first derivative is larger than a value referred to as "THRESHOLD1". Where the maximum value of the derivative is 255, the preferred value for THRESHOLD1 is 20, though those of ordinary skill in the art may use other values in order to achieve various desired effects. If the test of box 1004 is not met, this is a false edge caused by noise, in which case, control returns to 1001. If the test is met, the possibility of a false edge has been eliminated and control passes to box 1005.

At 1005, it is tested whether a low-pass third derivative is larger than the product of a value referred to as "THRESHOLD2" and the low-pass first derivative. The preferred value for THRESHOLD2 is 0.45, though again those of ordinary skill in the art may use other values in order to achieve other desired effects. In general, changing the values of THRESHOLD1 and THRESHOLD2 will determine whether the picture is sharper or fuzzier. If the two thresholds are low, in general, it makes the image sharper. Which is desired may be a matter of personal taste. If the test of box 1005 is not met, the putative edge is too soft to apply LTI to, and control is returned to box 1001. If so, the pixel is marked as an edge at 1006.

Determining Whether the Low-Pass Second Derivative Crosses Zero

The operations to be performed in box 1003 will now be described. A low-pass second derivative can be defined according to the following equation:

$$SD(n) \triangleq L(n-m) - 2 \times L(n) + L(n+m) \qquad (1)$$

Where n is an integer variable denoting a present pixel m is an integer variable related to the up-scaling factor. For an upscale factor of 2, the typical value of m will be four, but those of ordinary skill in the art may derive other values depending on what works best experimentally L(n) is the luminance value at pixel n SD(n) is the low-pass second derivative at pixel n $\triangleq$ means "is defined as"

The Laplace operator can be defined as follows:

$$S(n) \triangleq L(n-1) - 2 \times L(n) + L(n+1) \qquad (2)$$

where the function S(n) represents the Laplace transform of pixel n. More about the Laplace operator can be found in U.S. Pat. No. 5,852,470, especially in FIGS. 14A–E and the accompanying text, which patent is incorporated herein by reference.

The low-pass second derivative is preferred in order to eliminate the effects of aliasing, as shown in FIG. 8b. The low-pass second derivative according to the preferred embodiment uses the vector [−1, 0, 0, 0, 2, 0, 0, 0, −1], in contrast with the vector [−1, 2, −1] that is more commonly used for a second derivative, i.e. Laplace operator. This preferred vector can be derived by convolution of a low pass filter, [1, 2, 3, 4, 3, 2, 1] with the traditional Laplace operator.

Figure 11:
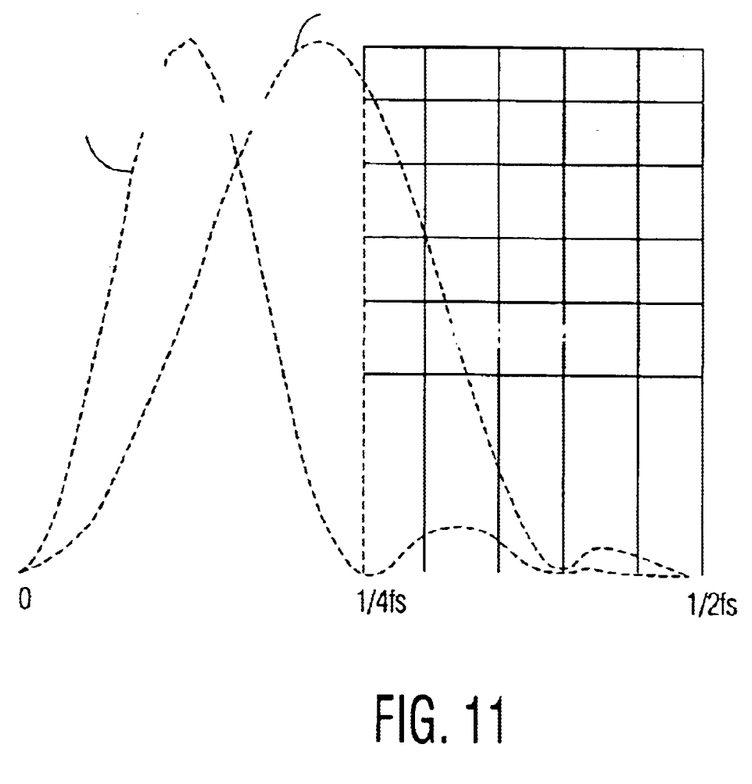
FIG. 11 shows the difference between the effects of standard and low pass Laplace operators.

FIG. 11 shows the frequency spectrum of the traditional and low pass Laplace operators, when combined with the anti-aliasing filter, in the frequency domain. The low pass Laplace operator yields the lower frequency curve.

Therefore, the low-pass second derivative can also be calculated in accordance with the following equation:

$$SD(n) = [1, 2, \ldots, m, \ldots, 2, 1] \otimes S(n) \qquad (3)$$

Where $[1, 2, \ldots, m, \ldots, 2, 1]$ is the impulse response of a low pass filter. Equation (3) is thus equivalent to equation (1).

The advantage of using the low-pass second derivative, as compared with the Laplace operator alone, is increased robustness in the face of noise and aliasing. Zero crossing is preferably determined where $$SD(n) \cdot SD(n-1) < 0 \qquad (4)$$

This zero crossing calculation identifies candidate edge pixels.

Determining Whether the Low-Pass First Derivative is Larger Than THRESHOLD1

The operations to be performed within box 1004 will now be described.

The low-pass first derivative is preferably determined in accordance with the following equation:

$$FD(n) \triangleq L(n-m) - L(n) \qquad (5)$$

where the function FD(n) represents the low-pass first derivative at pixel n.

The gradient operator can be calculated as follows:

$$F(n) \triangleq L(n-1) - L(n) \qquad (6)$$

Then, analogously with the previous calculation for the low-pass second derivative, the low-pass first derivative can be calculated as follows:

$$FD(n) = [1, 1, 1, \ldots, 1] \otimes F(n) \qquad (7)$$

where $[1, 1, 1, \ldots, 1]$ is an m-bit vector and is the impulse response of a low-pass filter. Thus both the low-pass first derivative and the low-pass second derivative are based on a low pass version of standard operators. The vector in each case is chosen to simplify the coefficients resulting after convolution. Those of ordinary skill in the art may devise other vectors to achieve a low pass effect for these derivatives.

If $$|FD(n)| \leq \text{THRESHOLD1} \qquad (8)$$

then the candidate pixel is retained. This calculation helps distinguish noise from actual edges.

Determining Whether the Low-Pass Third Derivative is Larger Than THRESHOLD2 Multiplied by the Low-Pass First Derivative The operations within box 1005 will now be described. This box effects what will be referred to herein as an "edge frequency calculation". This calculation determines the slope of the edge. In video signals, some edges have steep slopes, while some edges have more gradual slopes. Generally, one does not want to sharpen the edges that have more gradual slope. These edges may have been deliberately softened, for instance to give a face a soft or smooth look. The soft edges will generally have a lower frequency content. Accordingly, edges with a higher frequency content should be sharpened.

Since it is difficult to locate the start or end of an edge, it is not accurate to calculate the edge slope from the first derivative alone. Accordingly, it is proposed to use the ratio between the low-pass third derivative and the low-pass first derivative as an indication of edge frequency.

The low-pass third derivative can be calculated from the low-pass second derivative in accordance with the following equation:

$$TD(n) \triangleq SD(n) - SD(n-1) \qquad (9)$$

where the function TD(n) is the low-pass third derivative at pixel n. Since a low-pass second derivative is used, TD will be a low-pass third derivative.

The following calculation may performed:

$$\frac{TD(n)}{FD(n)} > \text{THRESHOLD2} \qquad (10)$$

If the condition is true, then the edge frequency is high, so the edge becomes a candidate for sharpness enhancement. Since division is fairly expensive, from an implementation point of view, the calculation of equation 10 is preferably expressed as a test of whether the low-pass third derivative is greater than the product of the low-pass first derivative and THRESHOLD2. This product calculation is fully equivalent to performing the ratio calculation of equation (10). Accordingly, herein, when it is stated that the ratio of the third to the first derivative is greater than a threshold, this will include the possibility that the third derivative is compared to the product of the threshold and the first derivative. When the term derivative is used herein without the term "low-pass", the intention is to include the low-pass version as a possible embodiment.

Figures 12A, 12B:
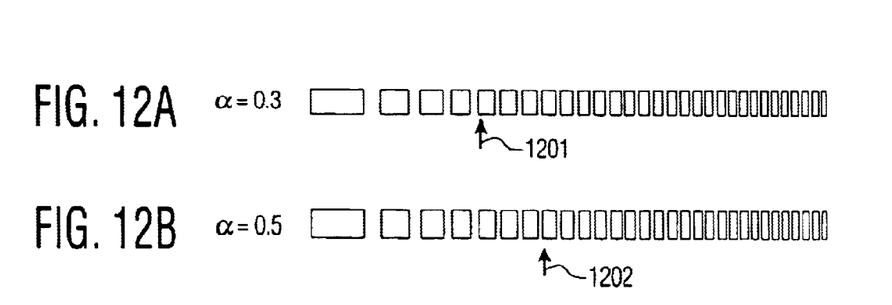
FIG. 12 shows the effect of different values of THRESHOLD2.
Figures 12C, 13A:
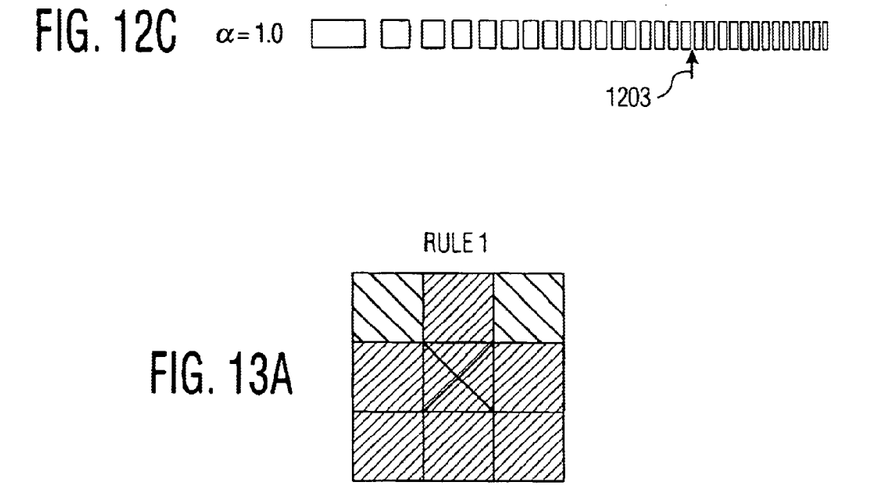
FIGS. 13A–F and FIGS. 14A–F show rules for edge linking.

Let us call the ratio between the low-pass third and low-pass first derivative ↦. FIGS. 12A–C show the effect on edge detection for different values of ↦. FIG. 12A is for ↦=0.3; FIG. 12B is for ↦=0.5; and FIG. 12C is for ↦=1.0. Each of these figures shows a pattern of increasing frequency. The small arrows 1201, 1202, 1203 below the figures show where edges begin to be detected. In each case, all edges at and to the right of the arrow are detected as edges, and values to the left are considered soft edges. LTI is not applied to the soft edges, only to the edges at or to the right of the arrow.

Edge Linking

FIGS. 13A–F and 14A–F illustrate the preferred edge linking rules for the vertical and horizontal scans, respectively. Those of ordinary skill in the art may also devise other types of edge linking techniques for use with the edge detection disclosed above.

The rules illustrated in the figures depart from the assumption that isolated pixels indicated as edges are probably not really edges. Edges typically extend over several pixels.

The rules are illustrated as considering a neighborhood of a present pixel. The present pixel is marked with an 'x' in each case. The neighborhood has been chosen to be 3×3, for simplicity, but those of ordinary skill in the art may use other size neighborhoods, to give better results. Those of ordinary skill in the art may design neighborhoods that are not square. The edge linking rules for neighborhoods of different sizes and shapes will be different from those illustrated here for the 3×3 case.

In the figures, the darkest shaded squares represent pixels that have been definitely established to be edges. The less darkly shaded squares represent pixels that are to be ignored with respect to the rule in question. The rules of FIGS. 13A–D and 14A–D relate to reconstruction of lines with breaks in them, while the rules of FIGS. 13E–F and 14E–F relate to elimination of false edges.

FIGS. 13A&B illustrate rule 1 for the vertical edge detection scan. FIG. 13A shows a situation where the upper left and upper right squares are known to be edges. In this situation, in accordance with FIG. 13B, the edge linker should mark the entire top row of pixels as an edge and the present pixel as not an edge.

Figure 13B:
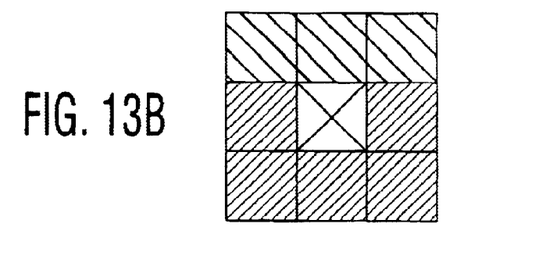
Figure 13C:
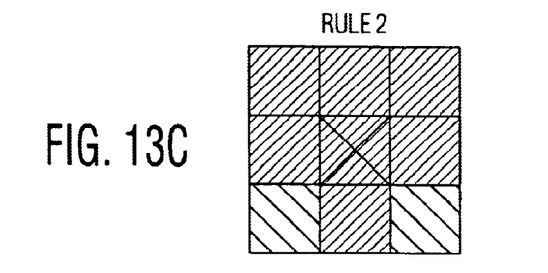
Figure 13D:
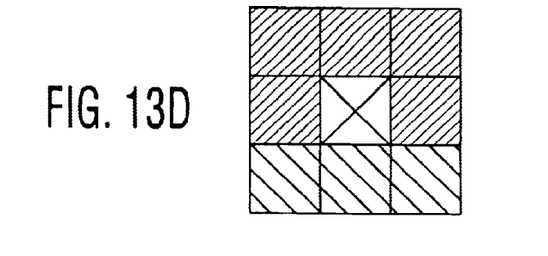

FIGS. 13C&D illustrate rule 2 for the vertical edge detection scan. FIG. 13C, shows the inverted situation from FIG. 13A. Now the bottom left and bottom right pixels have been identified as edges. In this situation, in accordance with FIG. 13D, the edge linking module should mark the entire bottom row of pixels as an edge and the present pixel as not an edge.

Figure 13E:
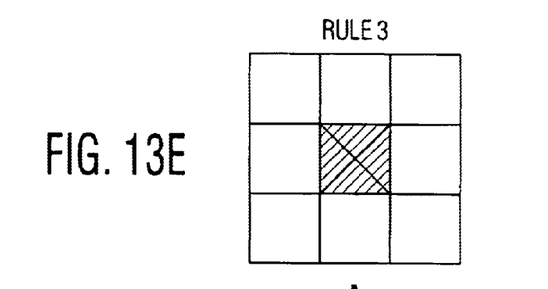
Figure 13F:
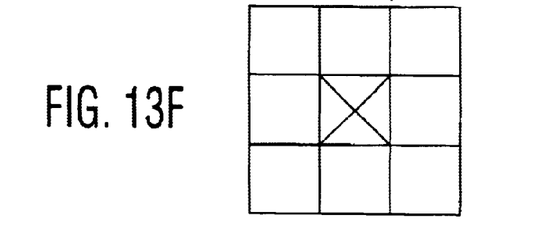

FIGS. 13E&F illustrate rule 3 for the vertical edge detection scan. FIG. 13E illustrates a situation in which all of the pixels surrounding the present pixel are known not to be edges. In such a case, the edge linker marks the present pixel to be not an edge.

Figure 14A:
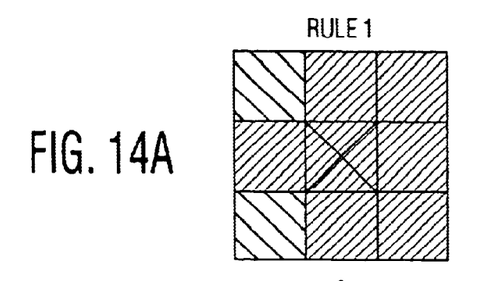
Figure 14B:
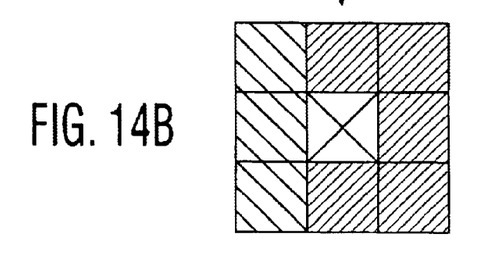

FIGS. 14A&B illustrate rule 1 for the horizontal edge detection scan. This is a 90 degree rotation of the rules of 13A–D. In FIG. 14A, the top and bottom left pixels are marked as edges. FIG. 14B shows that as a result of edge linking, the entire left column of pixels is marked as an edge, while the present pixel is marked as not being an edge.

Figure 14C:
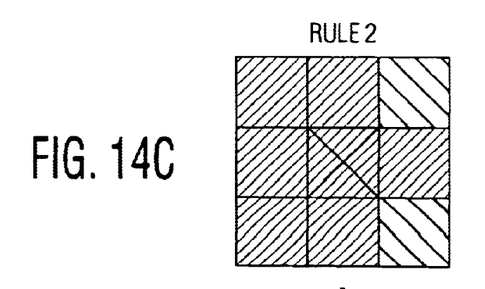
Figure 14D:
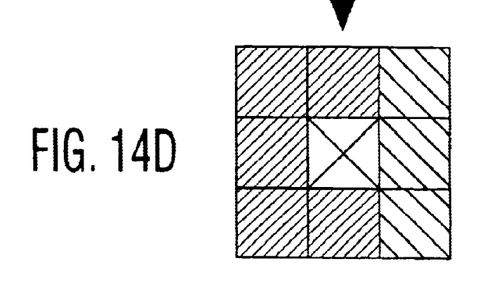

FIGS. 14C&D illustrate rule 2 for the horizontal edge detection scan. In FIG. 14C, the top and bottom right pixels are marked as edges. FIG. 14D shows the resulting action of the edge linker. In FIG. 14D, the entire right column of pixels is marked as an edge and the center pixel is marked as not an edge.

Figure 14E:
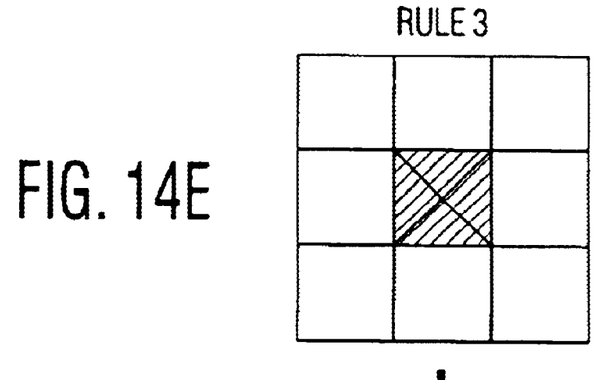
Figure 14F:
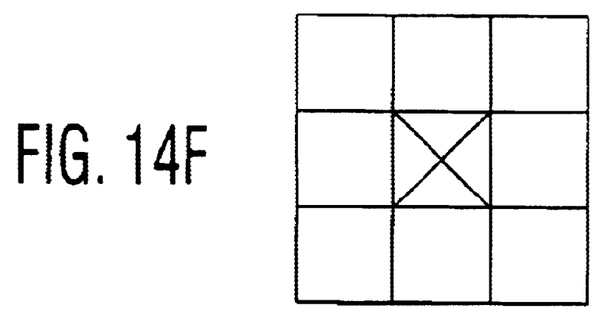

FIGS. 14E&F show rule 3 for the horizontal scan. Rule 3 for the horizontal scan is the same as rule 3 for the vertical scan.

From reading the present disclosure, other modifications will be apparent to persons skilled in the art. Such modifications may involve other features that are already known in the design, manufacture and use of image enhancement techniques and which may be used instead of or in addition to features already described herein. Especially, where hardware embodiments are shown, software may be substituted; and, where software embodiments are shown, hardware may be substituted. Although claims have been formulated in this application to particular combinations of features, it should be understood that the scope of the disclosure of the present application also includes any novel feature or novel combination of features disclosed herein either explicitly or implicitly or any generalization thereof whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

We claim:

1. An apparatus for edge detection, comprising:
   means for receiving an image signal;
   first means for detecting whether a second derivative of the image signal crosses zero;
   second means for detecting, in response to a positive result from the first means for detecting, whether a first derivative of the image signal is greater than a first threshold;
   third means for detecting, in response to a positive result from the second means for detecting, whether an indication of an edge frequency meets a predetermined criterion; and
   means for supplying an edge identification in response to a positive result from the third means for detecting.

2. The apparatus of claim 1, wherein:
   the image signal comprises a luminance signal;
   the indication of the edge frequency is a ratio between a third derivative of the luminance signal and a first derivative of the luminance signal; and
   the predetermined criterion is whether the ratio is greater than a threshold.

3. The apparatus of claim 2, wherein the third derivative is low-pass as a result of being calculated from a low-pass second derivative.

4. The apparatus of claim 1, wherein the image signal results from a vertical scan of an image, and the edge identification corresponds to a horizontal edge.

5. The apparatus of claim 1, wherein the image signal results from a horizontal scan of an image, and the edge identification corresponds to a vertical edge.

6. The apparatus of claim 1, wherein the image signal comprises a luminance signal and the second derivative is a low-pass second derivative.

7. The apparatus of claim 1, wherein the image signal is a luminance signal and the first derivative is a low-pass first derivative.

8. The apparatus of claim 1, wherein the means for receiving, first means for detecting, second means for detecting, third means for detecting, and means for supplying comprise a computer readable medium embodying code adapted to effect the operations.

9. The apparatus of claim 1, wherein the means for receiving, first means for detecting, second means for detecting, third means for detecting, and means for supplying comprise at least one hardware unit adapted to perform the operations.

10. The apparatus of claim 9, wherein the at least one hardware unit comprises a separate respective hardware unit adapted to perform each of the detecting operations.

11. The apparatus of claim 1, wherein the image is a video image and the image signal is a luminance signal.

12. The apparatus of claim 1, wherein the second derivative is a low pass second derivative resulting from a convolution between a second derivative operator and an operator corresponding to a low pass filter.

13. The apparatus of claim 12, wherein the operator corresponding to the low pass filter is of the form $[1, 2, \ldots, m, \ldots, 2, 1]$, where m is an integer variable relating to an up-scaling factor applied to the image signal prior to edge detection.

14. The apparatus of claim 13, wherein an operator corresponding to the low pass second derivative is of the form $[-1, 0, 0, 0, 2, 0, 0, 0, -1]$.

15. The apparatus of claim 12, wherein the low pass filter is of the form $[1, 1, 1, \ldots, 1]$.

16. The apparatus of claim 1, wherein the first derivative is a low-pass derivative resulting from a convolution between a derivative operator and an operator corresponding to a low pass filter.

17. The apparatus of claim 1, further comprising an edge linking unit.

18. A method for edge detection, comprising the steps of:
    receiving an image signal;
    performing a first detection detecting whether a second derivative of the image signal crosses zero;
    in response to a positive result from the first detection, performing a second detection detecting whether a first derivative of the image signal is greater than a first threshold;

in response to a positive result from the second detection, performing a third detection detecting whether an indication of an edge frequency meets a predetermined criterion; and supplying an edge identification in response to a positive result from the third detection.

19. The method of claim 18, wherein the image signal comprises a luminance signal;

the indication of the edge frequency is a ratio between a third derivative of the luminance signal and a first derivative of the luminance signal; and the predetermined criterion is that the ratio is greater than a threshold.

20. The method of claim 19, wherein the third derivative is low-pass as a result of being calculated from a low-pass second derivative.

21. The method of claim 18, wherein the image signal results from a vertical scan of an image, and the edge identification corresponds to a horizontal edge.

22. The method of claim 18, wherein the image signal results from a horizontal scan of an image, and the edge identification corresponds to a vertical edge.

23. The method of claim 18, wherein the image signal comprises a luminance signal and the second derivative is a low-pass second derivative.

24. The method of claim 18, wherein the image signal is a luminance signal and the first derivative is a low-pass first derivative.

25. The method of claim 18, wherein the steps are performed by code embodied on a computer readable medium.

26. The method of claim 18, wherein the steps are performed by at least one hardware unit.

27. The method of claim 26, wherein the at least one hardware unit comprises a separate respective hardware unit adapted to perform each of the detecting steps.

28. The method of claim 18, wherein the image is a video image and the image signal is a luminance signal.

29. The method of claim 18, wherein the second derivative is a low pass second derivative resulting from a convolution between a second derivative operator and an operator corresponding to a low pass filter.

30. The method of claim 19, wherein the operator corresponding to the low pass filter is of the form $[1, 2, \ldots, m, \ldots, 2, 1]$, where m is an integer variable relating to an up-scaling factor applied to the image signal prior to edge detection.

31. The method of claim 30, wherein an operator corresponding to the low pass second derivative is of the form $[-1, 0, 0, 0, 2, 0, 0, 0, -1]$.

32. The method of claim 18, wherein the first derivative is a low pass derivative resulting from a convolution between a derivative operator and an operator corresponding to a low pass filter.

33. The method of claim 18, further comprising linking at least two identified edges.

* * * * *